(12) United States Patent
Cha

(10) Patent No.: US 10,014,939 B2
(45) Date of Patent: Jul. 3, 2018

(54) SMART DEVICE PERFORMING LED-ID/RF COMMUNICATION THROUGH A CAMERA, AND SYSTEM AND METHOD FOR PROVIDING LOCATION-BASED SERVICES USING THE SAME

(71) Applicant: SEOUL NATIONAL UNIVERSITY OF TECHNOLOGY CENTER FOR INDUSTRY COLLABORATION, Seoul (KR)

(72) Inventor: Jae-Sang Cha, Seoul (KR)

(73) Assignee: SEOUL NATIONAL UNIVERSITY OF TECHNOLOGY CENTER FOR INDUSTRY COLLABORATION, Seoul (KR)

( * ) Notice: Subject to any disclaimer, the term of this patent is extended or adjusted under 35 U.S.C. 154(b) by 0 days.

(21) Appl. No.: 15/032,703

(22) PCT Filed: Oct. 28, 2014

(86) PCT No.: PCT/KR2014/010152
§ 371 (c)(1),
(2) Date: Apr. 28, 2016

(87) PCT Pub. No.: WO2015/064992
PCT Pub. Date: May 7, 2015

(65) Prior Publication Data
US 2016/0248505 A1    Aug. 25, 2016

(30) Foreign Application Priority Data

Oct. 28, 2013 (KR) .................. 10-2013-0128849

(51) Int. Cl.
*H04B 10/00* (2013.01)
*H04B 10/116* (2013.01)
(Continued)

(52) U.S. Cl.
CPC .............. *H04B 10/116* (2013.01); *G01S 5/16* (2013.01); *H04B 10/502* (2013.01); *H04W 4/02* (2013.01); *H04W 64/00* (2013.01)

(58) Field of Classification Search
CPC ....... H04B 10/116; H04B 10/502; G01S 5/16; H04W 4/02; H04W 64/00
(Continued)

(56) References Cited

U.S. PATENT DOCUMENTS 8,248,467 B1 * 8/2012 Ganick ................ G01C 21/206
340/13.24
9,014,564 B2 * 4/2015 Roberts ................ H04B 10/116
382/280
(Continued)

FOREIGN PATENT DOCUMENTS

KR        10-0594120         6/2006
KR      10-2006-0123580     12/2006
(Continued)

OTHER PUBLICATIONS

International Search Report for International Application No. PCT/KR2014/010152, dated Feb. 2, 2015.

*Primary Examiner* — Amritbir Sandhu
(74) *Attorney, Agent, or Firm* — Kile Park Reed & Houtteman PLLC

(57) ABSTRACT

The present invention provides a smart device which can receive, by an image sensor of a camera, a visible light signal generated by a light-emitting source such as a lighting apparatus or a display, and which can transmit the visible light signal to another terminal and light-emitting source by an LED flash of the camera, thereby enabling transmission and reception of visible light communication by the camera, which is equipped as standard in the smart device, as well as enabling transmission and relay of data by connecting to RF communication such as WiFi, Bluetooth and UWB. More- (Continued)

over, the present invention provides a system and a method for providing location-based services which measure an approximate current location of a user by an RF communication access point and measure the current location of the user in detail by receiving a visible light signal, which includes location information, from the light-emitting source, and thus can perform a high-precision indoor location recognition function linking visible light communication and RF communication and can provide guide image information, which comprises various additional information, on the basis of the location information of the user.

13 Claims, 3 Drawing Sheets

(51) Int. Cl.
    *G01S 5/16*     (2006.01)
    *H04B 10/50*     (2013.01)
    *H04W 4/02*     (2018.01)
    *H04W 64/00*     (2009.01)

(58) Field of Classification Search
    USPC .................................................. 398/118–131
    See application file for complete search history.

(56) References Cited

U.S. PATENT DOCUMENTS

| | | | | |
|---|---|---|---|---|
| 2005/0265731 A1* | 12/2005 | Keum | ................ | H04B 10/114 398/183 |
| 2009/0157309 A1* | 6/2009 | Won | ................ | G01C 21/20 701/533 |
| 2009/0175594 A1* | 7/2009 | Ann | ................ | H04N 7/025 386/357 |
| 2010/0138797 A1* | 6/2010 | Thorn | ................ | G06F 3/017 715/863 |
| 2012/0045215 A1* | 2/2012 | Kim | ................ | H04B 10/116 398/128 |
| 2013/0016978 A1* | 1/2013 | Son | ................ | H04B 10/116 398/118 |
| 2013/0027576 A1* | 1/2013 | Ryan | ................ | H04N 5/3532 348/222.1 |
| 2013/0141554 A1* | 6/2013 | Ganick | ................ | G01S 1/70 348/61 |
| 2013/0163994 A1* | 6/2013 | Iizuka | ................ | H04B 10/116 398/130 |
| 2013/0208184 A1* | 8/2013 | Castor | ................ | H04B 10/1149 348/552 |
| 2013/0211715 A1* | 8/2013 | Bae | ................ | G01S 19/48 701/469 |
| 2013/0251374 A1* | 9/2013 | Chen | ................ | H04B 10/1141 398/118 |
| 2013/0321920 A1* | 12/2013 | Suzuki | ................ | G02B 27/42 359/566 |
| 2014/0070707 A1* | 3/2014 | Nagazoe | ................ | H04B 10/116 315/151 |
| 2014/0086590 A1* | 3/2014 | Ganick | ................ | G06Q 30/02 398/118 |
| 2014/0160250 A1* | 6/2014 | Pomerantz | ........ | H04N 5/23229 348/47 |
| 2014/0186026 A1* | 7/2014 | Oshima | ................ | H04B 10/116 398/25 |
| 2014/0199082 A1* | 7/2014 | Iizuka | ................ | H04B 10/116 398/172 |
| 2014/0269658 A1* | 9/2014 | Sadasivam | ........ | H04W 72/0406 370/338 |
| 2014/0368601 A1* | 12/2014 | deCharms | .......... | H04W 4/021 348/14.02 |
| 2014/0375788 A1* | 12/2014 | Gabara | ................ | G06F 3/013 348/78 |
| 2015/0003836 A1* | 1/2015 | Yamasaki | ........ | H04B 10/116 398/118 |
| 2015/0006669 A1* | 1/2015 | Kauffmann | ........ | H04L 67/10 709/217 |
| 2015/0050994 A1* | 2/2015 | Mangold | ................ | A63F 13/213 463/31 |
| 2015/0147067 A1* | 5/2015 | Ryan | ................ | H04B 10/116 398/118 |
| 2015/0188629 A1* | 7/2015 | Oshima | ................ | H04B 10/116 398/118 |
| 2015/0200788 A1* | 7/2015 | Thomas | ................ | H04M 1/72533 455/420 |
| 2015/0280829 A1* | 10/2015 | Breuer | ................ | G01C 3/08 398/118 |
| 2015/0373503 A1* | 12/2015 | Jovicic | ................ | G01S 5/0252 455/456.1 |
| 2016/0047890 A1* | 2/2016 | Ryan | ................ | G01S 5/16 398/118 |
| 2016/0072584 A1* | 3/2016 | Ganick | ................ | H04N 5/2256 398/118 |
| 2016/0078680 A1* | 3/2016 | Reif | ................ | G06T 7/0044 345/633 |
| 2018/0007247 A1* | 1/2018 | Aggarwal | ........ | H04N 5/2258 |

FOREIGN PATENT DOCUMENTS

| | | |
|---|---|---|
| KR | 10-2012-0131916 | 12/2012 |
| KR | 10-2013-0028809 | 3/2013 |

\* cited by examiner

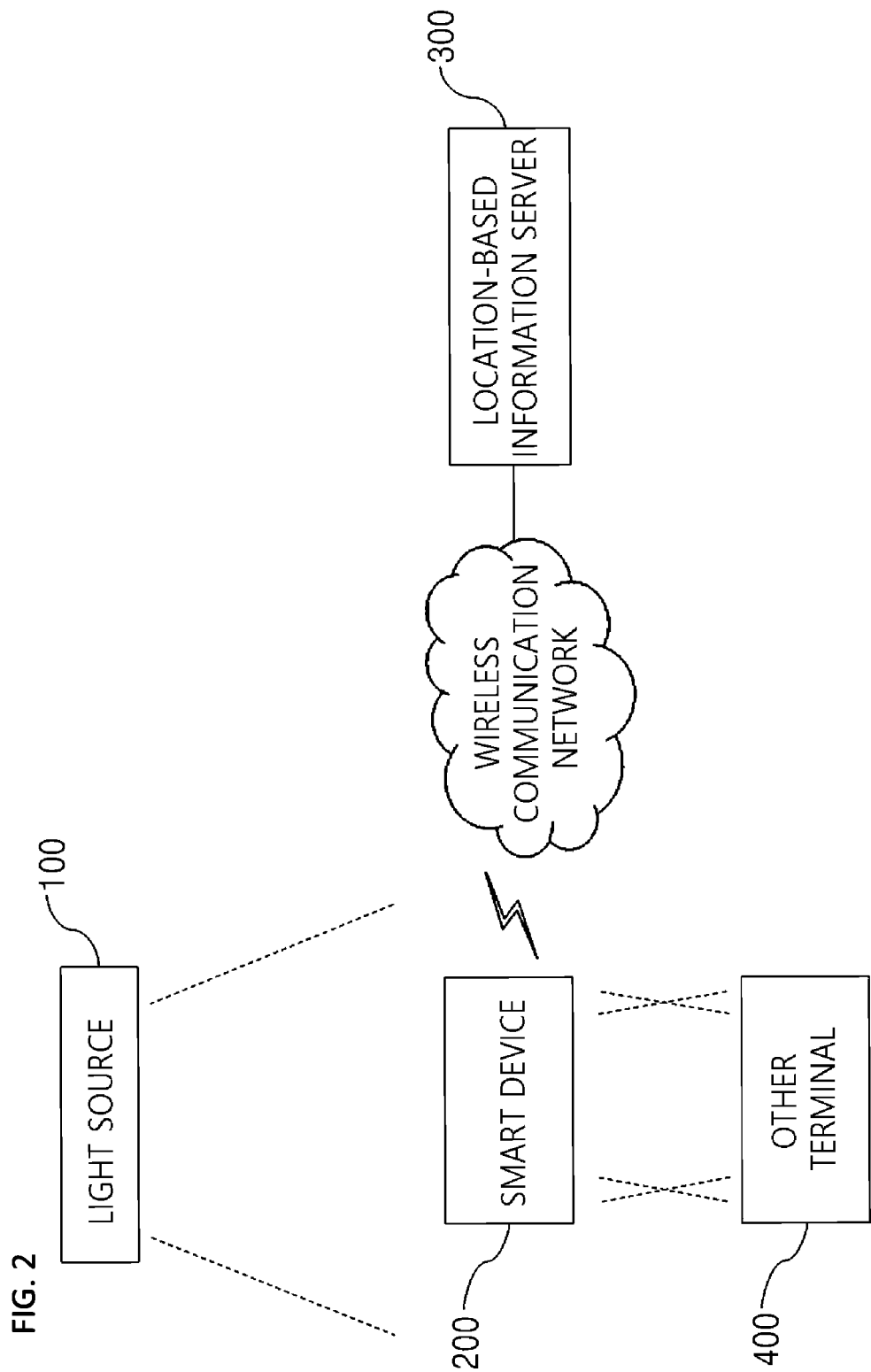

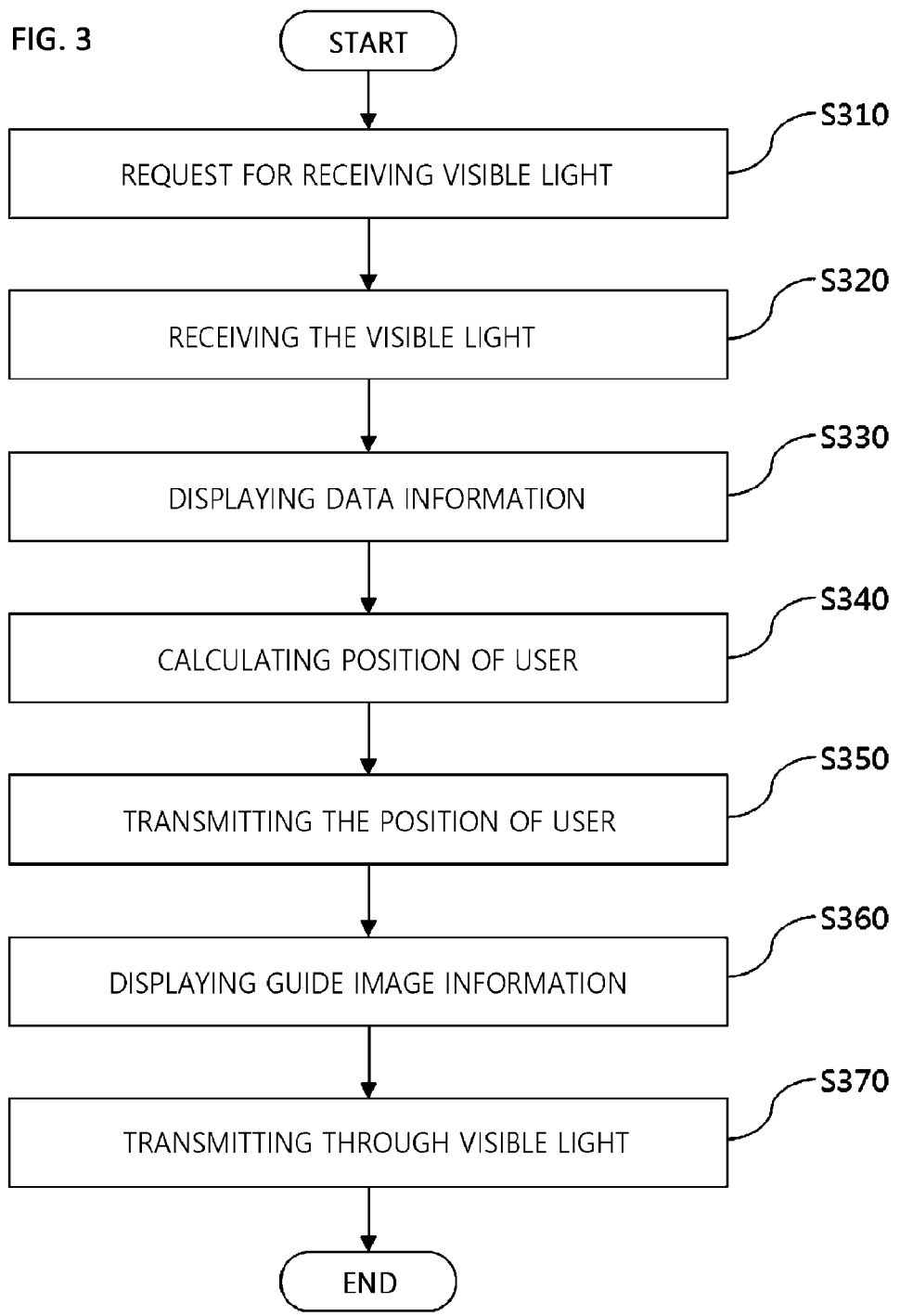

SMART DEVICE PERFORMING LED-ID/RF COMMUNICATION THROUGH A CAMERA, AND SYSTEM AND METHOD FOR PROVIDING LOCATION-BASED SERVICES USING THE SAME

TECHNICAL FIELD

The present invention relates to a LED-ID and RF communication technology, and more particularly to a smart device performing led-ID/RF communication through a camera, and a system and a method for providing location-based services using the same.

BACKGROUND ART

As people pursue a comfort life, an interest for a location-detecting technology for detecting a location of a user in a real time increases. Usually, a user have at least one mobile terminal and the detecting a location of the user can be performed through the mobile terminal.

Detecting a location of a mobile terminal may be performed through a GPS (Global Location System), a location service provided by a mobile-service company, and RFID (Radio Frequency Identification) or IR/Ultrasonic wave. According to the location detecting technology through GPS, GPS signal is received by an antenna of a mobile terminal, and a location of a user can be calculated based on the GPS signal and displayed on a display of the mobile terminal. According to the location detecting technology through the location service provided by a mobile-service company, a base station connected with a user (who joins the location service provided by a mobile-service company) is determined, and information that the user is within the service area of the base station is provided to the user. According to the location detecting technology through the RFID or the IR/Ultrasonic wave, the location of a user is measured by a wireless signal or IR/Ultrasonic wave provided at least three access points (APs).

However, the location detecting technology through GPS cannot be used in an area where the GPS signal cannot arrive (for example, an indoor area or an area with concentrated buildings). Moreover, the location detecting technology through the location service provided by a mobile-service company cannot focus the location of a user within a range of a few meters since the service area of the base station is very broad (hundreds of meters~a few kilometers). Further, the location detecting technology through RFID is not effective in expenses since a lot of RFID readers should be equipped in location detecting area, and the location detecting technology through IR/Ultrasonic wave cannot be used under non-catchable environment. Therefore, it is hard to use the location detecting technology through IR/Ultrasonic wave in a general office.

On the other hand, as VLC (Visible Light Communication) technology, which transmits data through visible light (400~700 nm), develops, interest in technology of location a user (or the mobile terminal) by using visible light increases.

However, until now, the technology is confined only in a communication based on indoor lighting apparatus, so that advanced location-based service is limited. Therefore, there exists a need for transmitting and receiving function with a mobile smart device anywhere and at any time, and a development of a system capable of embodying precise LBS is requested.

DISCLOSURE

Technical Problem

Therefore, the present invention is for solving the problems of prior art. That is, the object of the present invention is to provide a smart device which can receive, by an image sensor of a camera, a visible light signal generated by a light-emitting source such as a lighting apparatus or a display, and which can transmit the visible light signal to another terminal and light-emitting source by an LED flash of the camera, thereby enabling transmission and reception of visible light communication by the camera, which is equipped as standard in the smart device, as well as enabling transmission and relay of data by connecting to RF communication such as WiFi, Bluetooth and UWB.

Moreover, another object of the present invention to provide a system and a method for providing location-based services which measure an approximate current location of a user by an RF communication access point and measure the current location of the user in detail by receiving a visible light signal, which includes location information, from the light-emitting source, and thus can perform a high-precision indoor location recognition function linking visible light communication and RF communication and can provide guide image information, which comprises various additional information, on the basis of the location information of the user.

Technical Solution

A smart device performing led-ID/RF communication through a camera, according to the present invention, comprises, a visible light transmitting and receiving module having a visible light receiving module receiving a visible light signal including a location information or a data information from a light-emitting source through an image sensor of a camera, and a visible light transmitting module transmitting a visible light signal including a location information or a data information through an LED flash of the camera; an image-capturing module capturing an image of peripheral region of the light-emitting source through the image sensor of the camera; a telecommunication module performing RF communication; a key-input module having a plurality of selection keys; a display module displaying the data information received by the visible light receiving module; a location calculating module calculating a present location of a user by a location information of a user, which is received from an access point through the telecommunication module, and the location information of the light-emitting source, which is received from the light-emitting source as a visible light signal; and a control module transmitting the present location of a user calculated by the location calculating module or data information to another terminal or the light-emitting source through the visible light transmitting module.

Further, a system for providing location-based services using a smart device performing led-ID/RF communication through a camera, according to the present invention, includes at least one light-emitting source generating visible light having location information of its own; a smart device calculating a present location of a user by a location information of a user, which is received from an access point, and the location information of the light-emitting source, which is received from the light-emitting source as a visible light signal; and a location-based information server generating a guide image information including additional information according to the location information of a user, which is received from the smart device, to provide the smart device with the guide image information.

Furthermore, a method for providing location-based services, according to the present invention, includes receiving, by a visible light receiving module of a smart device, visible light signal including location information or data information from a light-emitting source; displaying, by a display module of the smart device, the data information, when the visible light signal includes the data information; calculating a present location of a user by a location information of a user, which is received from an access point through the telecommunication module, and the location information of the light-emitting source, which is received from the light-emitting source as a visible light signal, when the received visible light includes the location information; transmitting the calculated present location information to a location-based information server; and receiving guide image information including additional information generated in accordance with the present location information to display the guide image information through the display module.

Advantageous Effects

According to the present invention, transmission and reception of visible light communication by the camera, which is equipped as standard in the smart device are enabled, and transmission and relay of data by connecting to RF communication such as WiFi, Bluetooth and UWB are enabled.

Further, detailed location of a user is calculated through the location information of the light-emitting source in the rough location through the access point to perform precise indoor location through the visible light communication and the RF communication, so that a blind spot of location under indoor and short-distance environment can be minimized, and the degree of precision regarding location can be enhanced.

DESCRIPTION OF DRAWINGS

FIG. 2 is a diagram showing a system for providing location-based services according to an embodiment of the present invention.

FIG. 3 is a flow chart showing a method for providing location-based services according to an embodiment of the present invention.

MODE FOR INVENTION

Figure 1:
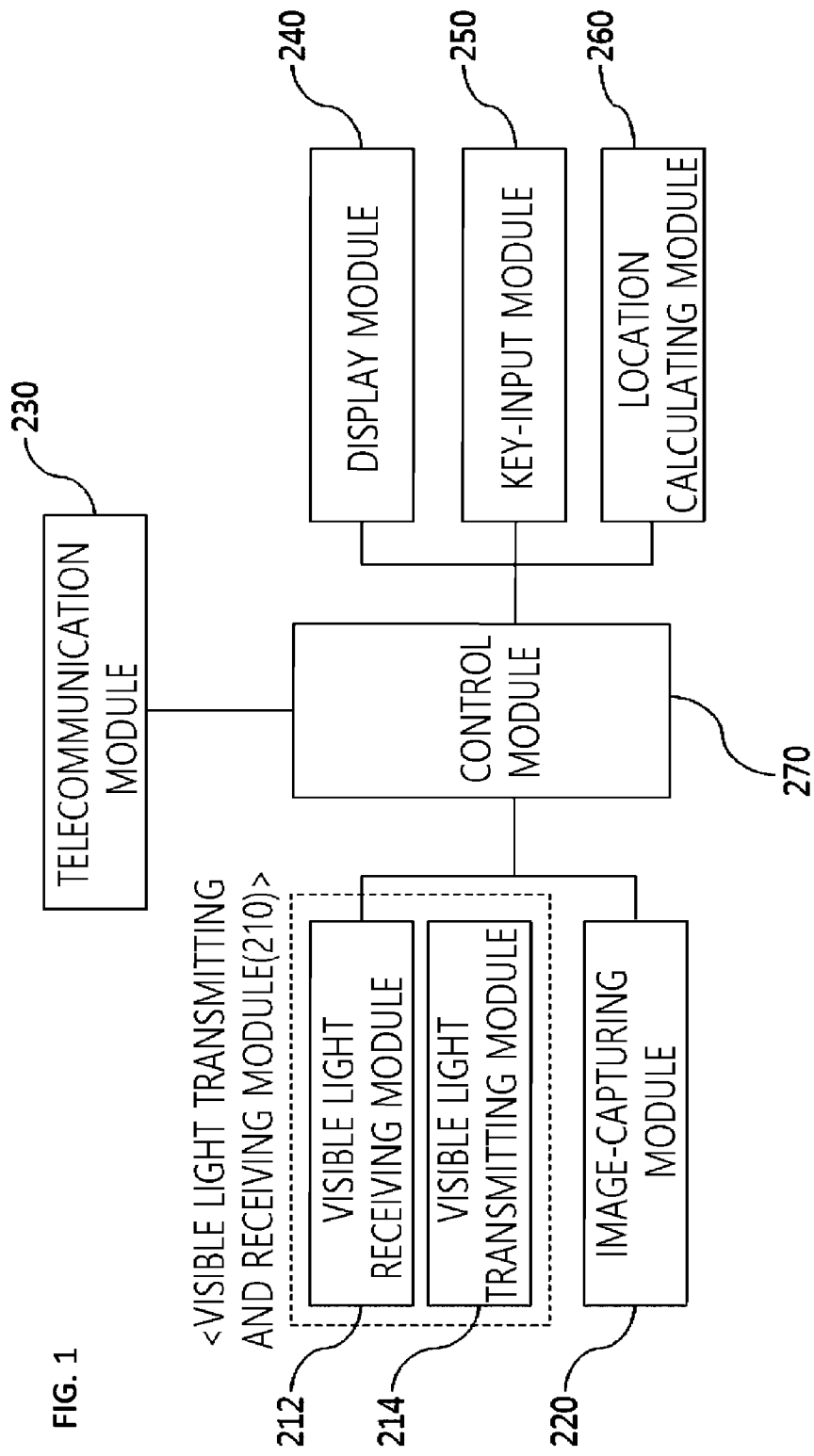
FIG. 1 is a block diagram showing an internal structure of a smart device according to an embodiment of the present invention.

The present invention may have various modifications and shapes, but will be explained as an example referring to figures in detail.

However, the specification and cases below are for showing embodiments of the present invention but only for examples. The present invention may, however, be embodied in many different forms and should not be construed as limited to the example embodiments set forth herein. It will be understood that, although the terms first, second, third etc. may be used herein to describe various elements, components, regions, layers and/or sections, these elements, components, and/or sections should not be limited by these terms. These terms are only used to distinguish one element, component, region, layer or section from another region, layer or section. Thus, a first element, component, or section discussed below could be termed a second element, component, or section without departing from the teachings of the present invention.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described with reference to the accompanying drawings.

First of all, a smart device according to the present invention may be one of a smart phone, a mobile phone, an MP3 player, a game console, a navigation system, a television, a display device, a notebook computer, a tablet computer, a personal media player (PMP), a personal digital assistant (PDA), etc., and the present invention will be explained by using a smart phone that is a representative of the smart device. The detailed explanation regarding to well-known function or well-known structure, which can defocus the gist of the present invention, will be omitted.

FIG. 1 is a block diagram showing an internal structure of a smart device according to an embodiment of the present invention.

Referring to FIG. 1, the smart device of the present invention includes a visible light transmitting and receiving module 210 having a visible light receiving module 212 and a visible light transmitting module 214, an image-capturing module 220, a telecommunication module 230, a display module 240, a key-input module 250, a location calculating module 260 and a control module 270.

The visible light receiving module 212 receives visible light signal broadcasted by a light-emitting source such as a lighting apparatus, a display, etc. through an image sensor of a camera. The visible light from the light-emitting source may include location information of the light-emitting source and low speed data information.

The visible light transmitting module 214 transmits location information of a user or low speed data information to another terminal or light-emitting source in a form of visible light through a LED flash of a camera.

Therefore, the smart device of the present invention can communicates with the light-emitting source or another terminal by transmitting/receiving visible light signal through the visible light transmitting and receiving module 210 formed by a camera, and transmit data in connection with RF communication such as WiFi, Bluetooth, UWB, etc. That is, it is possible to communicate between the smart device and the light-emitting source through the visible light communication, and it is possible to communicate between the smart devices through the visible light communication and the RF communication, so that it is possible to embody transmitting function by using RF communication mixed with LED-ID.

The visible light transmitting and receiving module 210 may be equipped within the device having a camera therein, or the visible light transmitting and receiving module 210 may be separately formed with the device and connected to the device through a connection terminal. The camera may be a high performance camera, a depth camera, or a multi-camera with at least two cameras.

Moreover, aside from a camera, a transmitter-receiver exclusively used only for receiving and transmitting visible light may be separately formed with the device and connected with the device through a connection terminal to embody the visible light transmitting and receiving module 210. The transmitter-receiver exclusively used only for receiving and transmitting visible light may be formed through an LED for transmitting and a photodiode for receiving.

The image-capturing module 220 captures image of peripheral region of the light-emitting source through an image sensor of the camera.

The telecommunication module 230 is a communication interface performing RF communication such as WiFi, Bluetooth, UWB, etc.

The key-input module 250 includes a plurality of selection keys, and transmits input signal of key input performed by a user to the control module 270. The key-input module 250 includes a request button for receiving visible light signal, a request button for transmitting visible light signal, a menu key for controlling additional information, a power button for turning on/off the smart device, etc.

The display module 240 displays various images to a user. The display module 240 displays a low speed data information received as visible light through the visible light receiving module 212, and displays guide image information including location information of a user, which is received through the telecommunication module 230. The display module 240 may be embodied through a touch screen with multi-touch function so that the display module 240 may be integrally formed with the key-input module 250.

The location calculating module 260 receives a rough location information of a user through access point from the telecommunication module 230, and receives location information of the light-emitting source from the light-emitting source through the visible light receiving module 212 to calculate the location of a user by using the location information of the light-emitting source received from the light-emitting source and an image captured by the image-capturing module 220. As described above, according to the present invention, detailed location of a user is calculated through the location information of the light-emitting source in the rough location through the access point to perform precise indoor location through the visible light communication and the RF communication, so that a blind spot of location under indoor and short-distance environment can be minimized, and the degree of precision regarding location can be enhanced. Further, the location calculating module 260 uses the captured image and the received location information of the light-emitting source to calculate location of a user. Therefore, precise location of a user can be obtained even though visible light signal is received from only one light-emitting source. In this case, the location information of the light-emitting source may include address information, building information, floor information, section information, absolute location coordinate information etc.

The control module 270 controls overall operation of the smart device. Especially, the control module 270 determines if the location information of the light-emitting source or the visible light signal including the low speed data information are received through the visible light receiving module 212 to display the low speed data information in the received visible light through the display module 240, and to transmit the location information of the light-emitting source to the location calculating module 260.

Moreover, the control module 270 transmits the location information of a user, which is calculated by the location calculating module 260, to a location-based information server through the telecommunication module 260 to receive a guide image information including additional information corresponding to the location information of a user, and controls the display module 240 to display the guide image information.

Further, the control module 270 transmits the location information received from the light-emitting source according to a request of a user, data information or information stored in the smart device to another terminal or to a light-emitting source in a form of visible light signal. In this case, the control module 270 may perform a specific source coding for reducing a blinking effect induced by repeating one and zero to transmit a low speed data with reduced blinking effect in a form of visible light. Therefore, the smart device according to the present invention is capable of performing visible light communication through receiving visible light signal from a light-emitting source or another terminal or transmitting visible light signal to a light-emitting source or another terminal, and is capable of transmitting and broadcasting data in connection with RF communication such as WiFi, Bluetooth, UWB, etc.

FIG. 2 is a diagram showing a system for providing location-based services according to an embodiment of the present invention.

Referring to FIG. 2, the smart device 200 according to an embodiment of the present invention receives visible light signal including location information or low speed data information from a light-emitting source 100 such as a lighting apparatus, a display, etc. Through this, the smart device 200 according to an embodiment of the present invention receives a rough location information of a user through access point, and receives location information of the light-emitting source from the light-emitting source to calculate the location of a user by using the location information of the light-emitting source received from the light-emitting source and an image of environment of the light-emitting source.

Therefore, according to the present invention, the precise location information of a user is calculated through the location information of the light-emitting source in the rough location information the user obtained by the access point, so that exact location information can be obtained even in an indoor area or an area with concentrated buildings. Further, the smart device 200 of the present invention uses the captured image and the received location information of the light-emitting source to calculate location of a user. Therefore, precise location of a user can be obtained even though visible light signal is received from only one light-emitting source. In this case, the location information of the light-emitting source may include address information, building information, floor information, section information, absolute location coordinate information etc.

Then, the smart device 200 transmits the location of the user to a location-based information server 300 to receive a guide image information including an additional information corresponding to the location of the user. In the present embodiment, the calculated location of a user is transmitted to the location-based information server 300 through RF communication and the guide image information including an additional information corresponding to the location of the user is received. However, other embodiment is possible. That is, the location information of a user may be transmitted to an information guidance system terminal 400 such as a kiosk in a building through a visible light communication, and the guide image information including the additional information corresponding thereto may be received through RF communication, so that the visible light communication and RF communication are used in mixture.

Therefore, a user can obtain exact location of his own even in an indoor area or an area with concentrated buildings where GPS signal cannot reach, so that the user can receive the guide image information including various additional information in accordance with the location of the user. The various additional information may include, for example, a map service, navigation service, information service in a building, a program guidance and a ticket booking service of sports, movie, theater, musical, etc., famous restaurant information, restaurant-booking service, goods-location guidance service in a mart, etc.

The light-emitting source 100 in the present invention may be a lighting apparatus, a display, etc. The light-emitting source 100 may constitute a tag for transmitting location information or low speed data information, or may form pseudo-lite group for transmitting location information or low speed data information at a ceiling, based on the lighting apparatus or the light-emitting source.

FIG. 3 is a flow chart showing a method for providing location-based services according to an embodiment of the present invention.

Referring to FIG. 3, when there exists a request for receiving visible light by a user (step S310), the control module of the smart device determines if the visible light including location information of a light-emitting source or data information is received, and receives the visible light through a visible light receiving module (step S320).

Then, when the received visible light signal includes the data information, the control module displays the data information through the display module (step S330), and when the received visible light signal includes the location information, the control module calculates the location of the user through the location calculating module (S340).

In this case, the location calculating module receives a rough location information of a user through access point from the telecommunication module, and receives location information of the light-emitting source from the light-emitting source through the visible light receiving module to calculate the location of a user by using the location information of the light-emitting source received from the light-emitting source and an image captured by the image-capturing module. As described above, according to the present invention, detailed location of a user is calculated through the location information of the light-emitting source in the rough location through the access point to perform precise indoor location through the visible light communication and the RF communication, so that a blind spot of location under indoor and short-distance environment can be minimized, and the degree of precision regarding location can be enhanced.

Then, the control module transmits the location of a user, which is calculated by the location calculating module, to the location-based information server (step S350), and receives a guide image information including an additional information, which is generated according to the location of a user, from the location-based information server to display the guide image information through a display module (step S360). The additional information may include, for example, a map service, navigation service, information service in a building, a program guidance and a ticket booking service of sports, movie, theater, musical, etc., famous restaurant information, restaurant-booking service, goods-location guidance service in a mart, etc.

Moreover, the control module transmits the location information and the data information received from the light-emitting source through the visible light transmitting module according to the request of a user, or information stored in the smart device to another terminal or the light-emitting source, through visible light (step S370). In this case, the control module may perform a specific source coding for reducing a blinking effect induced by repeating one and zero to transmit a low speed data with reduced blinking effect in a form of visible light.

Therefore, the smart device of the present invention transmits the location of a user to a location-based information server through RF communication, and receives the guide image information including the additional information. Further, the smart device transmits the location information of a user to the information guidance system terminal such as a kiosk in a building through a visible light communication, and receives the guide image information including the additional information corresponding thereto through RF communication, so that the visible light communication and RF communication are used in mixture.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A smart device performing light emitting diode-identification (LED-ID) and radio frequency (RF) communication through a camera, the smart device comprising:
   a visible light transmitting and receiving module comprising:
      a visible light receiving module that receives, from a light-emitting source through an image sensor of the camera, a visible light signal including a location information of the light-emitting source or a data information, and
      a visible light transmitting module that transmits the visible light signal including the location information or the data information through an LED flash of the camera;
   a telecommunication interface that performs RF communication to receive a rough location information of a user from an access point;
   a key-input module having a plurality of selection keys;
   a display screen that displays the data information received by the visible light receiving module; and
   circuitry configured to
   capture an image of a peripheral region of the light-emitting source through the image sensor of the camera, via an image-capturing module;
   receive the rough location information of the user from the telecommunication interface, the image captured by the image-capturing module from the image-capturing module, and the location information of the light-emitting source from the light-emitting source, via a location calculating module;
   calculate a precise location of the user using the image captured by the image-capturing module and using the location information of the light-emitting source in the rough location information, via the location calculating module; and
   transmit the precise location of the user calculated by the location calculating module or the data information to another terminal or the light-emitting source through the visible light transmitting module, via a control module.

2. The smart device of claim 1, wherein the visible light transmitting and receiving module is equipped within the smart device to be integrally formed with the smart device.

3. The smart device of claim 1, wherein the visible light transmitting and receiving module is separately formed with the smart device and connected to the smart device through a connection terminal.

4. The smart device of claim 1, wherein the visible light transmitting and receiving module is a transmitter-receiver having an LED for transmitting and a photodiode for receiving, which is separately formed with the smart device and connected to the smart device through a connection terminal.

5. The smart device of claim 1, wherein the camera is a multi-camera with at least two cameras.

6. The smart device of claim 1, wherein the camera is a depth camera.

7. The smart device of claim 1, wherein the camera is a high performance camera.

8. A system for providing location-based services using a communication device performing light emitting diode-identification (LED-ID) and radio frequency (RF) communication through a camera, the system comprising:
    at least one lighting apparatus or display that generates visible light having a location information of the at least one lighting apparatus or display;
    the communication device receiving a rough location information of a user from an access point, an image captured by an image-capturing module of the communication device from the image-capturing module, and the location information of the at least one lighting apparatus or display from the at least one lighting apparatus or display as a visible light signal and calculating a precise location of the user using the image captured by the image-capturing module and using the location information of the at least one lighting apparatus or display in the rough location information; and
    a location-based information server generating a guide image information including additional information according to the precise location of the user, which is received from the communication device, to provide the communication device with the guide image information.

9. The system of claim 8, wherein the communication device transmits the calculated precise location of the user through visible light communication.

10. The system of claim 8, wherein the communication device transmits the calculated precise location of the user through the RF communication.

11. A method for providing location-based services, the method comprising:
    receiving, by a photodiode of a smart device, a visible light signal including a location information of a light-emitting source or a data information from the light-emitting source;
    displaying, by a display module of the smart device, the data information, when the visible light signal includes the data information;
    receiving, by a telecommunication interface of the smart device, a rough location information of a user from an access point;
    receiving, by a location calculating module of the smart device, the rough location information of the user from the telecommunication interface, an image captured by an image-capturing module of the smart device from the image-capturing module, and the location information of the light-emitting source from the light-emitting source;
    calculating, by the location calculating module of the smart device, a precise location of the user using the image captured by the image-capturing module and using the location information of the light-emitting source in the rough location information, when the received visible light includes the location information;
    transmitting, by a light emitting diode of the smart device, the calculated precise location information to a location-based information server; and
    receiving, by the telecommunication interface of the smart device, guide image information including additional information generated in accordance with the precise location information from the location-based information server to display the guide image information through the display module.

12. The method of claim 11, wherein transmitting the calculated precise location information to the location-based information server is performed through visible light communication.

13. The method of claim 11, wherein transmitting the calculated precise location information to the location-based information server is performed through radio frequency (RF) communication.

* * * * *